United States Patent
Masunaga

(12) 
(10) Patent No.: US 6,398,362 B1
(45) Date of Patent: Jun. 4, 2002

(54) ASSEMBLY OF CLIP-ON ATTACHMENT SPECTACLES

(75) Inventor: Satoru Masunaga, Fukui (JP)

(73) Assignee: Masunaga Optical Mfg., Co., Ltd., Fukui (JP)

( * ) Notice: Subject to any disclaimer, the term of this patent is extended or adjusted under 35 U.S.C. 154(b) by 0 days.

(21) Appl. No.: 09/950,775

(22) Filed: Sep. 13, 2001

(30) Foreign Application Priority Data

Sep. 13, 2001 (JP) .......................................... 2001-278065

(51) Int. Cl.$^7$ ................................................. G02C 9/00

(52) U.S. Cl. .......................................... 351/47; 351/57

(58) Field of Search .............................. 351/47, 48, 44, 351/41, 57, 58, 141

(56) References Cited

U.S. PATENT DOCUMENTS 5,936,702 A  *  8/1999  Cheong ....................... 351/141
6,341,864 B1 *  1/2002  Ng ............................... 351/47

* cited by examiner

*Primary Examiner*—Hung Xuan Dang
(74) *Attorney, Agent, or Firm*—Snider & Associates; Ronald R. Snider

(57) ABSTRACT

For the purpose of improving upon a clip-on attachment spectacles, an easy assembly therefor is provided herein, which assembly takes advantage of such merit of the prior clip-on attachment spectacles as the bridge portion thereof elastically contracts and extends so as to hand onto the frontal surface of the lenses of the spectacles in use, but which assembly structurally facilitates not only the extension and contraction of the bridge portion, but also the engagement between the bridge portion of the attachment spectacles and the glasses thereof as well as that between the hooks to be hung onto the lenses of the spectacles in use and the attachment glasses.

The above assembly comprises a springy bridge, the interval between the respective ends of which bridge is elastically variable and a profiled rod provided at the respective ends of which bridge inserts through the respective glasses so as to interconnect said glasses with each other; an inwardly inclined hook that hangs onto the respective lenses of the spectacles in use, said hook being provided with a profiled rod that inserts through the respective glasses at the respective outer upper and lower rim portions thereof; a cap that mounts into the profiled rod of the bridge and that of the hook at the inner side of the respective glasses so as to firmly engage the respective glasses with the bridge and the hook, respectively.

14 Claims, 3 Drawing Sheets

ASSEMBLY OF CLIP-ON ATTACHMENT SPECTACLES

RELATED APPLICATION

This application claims the priority of Japanese Patent Application No. 2001-278065 filed on Sep. 13, 2001, which application is incorporated herein by reference.

BACKGROUND OF THE INVENTION

1. Technical Field

The present invention relates to an improvement upon attachment spectacles, in more details, pertaining to assembly of such attachment spectacles as being easy to be assembled and being able to be attached easy and fast onto a pair of spectacles on wear.

2. Prior Art

A so-called attachment spectacles, which is disposed immediately in front of the spectacles in use to secure proper visibility for the wearers in accordance with the change of the intensity of property of the incident lights for the purposes of removing the ultra-violet rays and preventing the harsh light, is well-known and is widely used for such outdoor activities as driving, skiing and fishing and so forth as well as for such indoor activities as the display viewing of a computer.

However, the conventional attachment spectacles is mostly arranged such that a clip is provided along the rear side surface of the transversely long frame in which the respective glasses are juxtaposed to each other through a bridge, through which clip the attachment spectacles is suspended onto the respective lenses of the spectacles in use. Thus, there are a lot of cases where the respective lenses of the spectacles in use are scratched by the clip, the countermeasure against which has been sought after.

Under the circumstances, the attachment spectacles as shown in FIG. 7 has been proposed, which is characterized in that the respective glasses S' and S' are connected by a bridge B that contracts and extends by the action of a tension spring Bs and are aligned with the frontal surface of the spectacles M' in use by widening the interval between the glasses S' and S' and are attached onto the respective lenses L' and L' of the spectacles in use by elastically contracting the spring Bs.

Indeed, in view of the assembly of such conventional attachment spectacles as shown in FIG. 7, it hardly occurs that the glasses L' and L' of the spectacles in use are damaged differently from the clip-on attachment spectacles as mentioned above. However, the bridge portion thereof that extends and contracts by the tension spring Bs cannot help becoming complicated in structure so that it contradicts the trend of the times in pursuit of structural weight reduction, in addition to which the lenses L' and L' are to be screwed onto the outer frame portion of the attachment spectacles so as to further complicate its assembly work and to unavoidably increase the production cost.

DISCLOSURE OF THE INVENTION

In view of the foregoing inconveniences encountered with the prior art, the present invention provides an assembly of clip-on attachment spectacles, which exploits the merit of the conventional attachment spectacles as shown in FIG. 7 wherein the attachment spectacles is suspended in front of the spectacles in use by elastically extending and contracting the bridge portion thereof, but facilitates the structure of the same bridge portion and the engagement between the bridge portion and the respective glasses as well as that between the hook to be hung onto the respective lenses of the spectacles in use and the glasses of the attachment spectacles is easy and simple to be performed.

That is to say, the present invention adopts an assembly of clip-on attachment spectacles comprising a transversely long springy bridge, the interval between the respective ends of which is elastically variable and the profiled rod provided at the respective ends of which goes through the respective glasses so as to hold the same glasses in juxtaposition; an inwardly inclined hook provided with a profiled rod to go through the respective glasses at the respective outer upper and lower rim portions thereof; a cap to fixedly engage the respective glasses with the bridge and the hook respectively by mounting into the respective profiled rods of the bridge and the hook at an inner side surface of the respective glasses, wherein the clip-on attachment spectacles is placed immediately in front of the spectacle lenses in use with the bridge extended against its springy contraction force so as to widen the interval between the respective glasses and the respective hooks are hung onto the respective lenses of the spectacles in use by elastically contracting the bridge.

The assembly parts of the clip-on attachment spectacles of the present invention are as follows.

(1) The springy bridge is normally formed into a curved shape, which bridge is made of such well-known metallic materials as German silver, β-titanium and super elastic alloy such as Ni—Ti based alloy that are rich in springy property, and which bridge may be also made of such well-known engineering plastics rich in elasticity as polyphenylene sulfide. In case where the springy and curved bridge is adopted, due care should be taken so that it is connected onto the attachment glasses without being bent towards and touched on a face of the wearer.

(2) A profiled rod to go through the respective glasses is protrusively provided on the respective ends of the springy bridge, on the circumferential surface of which rod the protrusion like a fang, a lump or a knot is formed.

(3) The inwardly inclined hook to be suspended onto the respective lenses of the spectacles in use is provided with a profiled rod to be mounted into the respective attachment glasses as the outer upper and lower rims thereof, on the circumferential surface of which rod the protrusion like a fang, a lump or a knot is formed in the same way as the profiled rod of the above springy bridge. The inwardly inclined hook that is disposed on the upper rim portion or the respective glasses may be integrally provided at the respective ends of the springy bridge as mentioned above, in which case, the profiled rods of the hooks play the role of those provided at the respective ends of the bridge. The inwardly inclined hook may be made of either plastic or metallic materials or any kinds of other materials.

(4) The property of the clip-on glasses may be of colored type to absorb the ultra-violet rays or polarized type or a convex lens for near work, which material is centered on plastics for the reduction of the weight. An aperture is opened in a portion of the respective clip-on glasses into which portion the profiled rod of the bridge and of the inwardly inclined rod respectively is inserted.

(5) The cap 3 to be mounted into the profiled rod of the bridge and the hook respectively at the inner side of the respective clip-on glasses is made of plastics or rubber and is mounted into the profiled rod with elastically deformed in the aperture provided through the respective clip-on glasses.

BEST MODE FOR CARRYING OUT THE INVENTION

Hereafter, the preferred embodiment of the present invention is in more details described below with reference to the accompanying drawings.

Number 1 in FIGS. 1 to 5 indicates a springy bridge that is made of β-titanium in this embodiment, which bridge is integrally provided with a flange 1a to abut onto the frontal side surface of the respective attachment glasses S and S and a profiled rod 11 that extends towards the respective glasses in place. An enlarged portion 12 is provided at the tip end of the profiled rod 11, into which enlarged portion a cap as described below is mounted so as to prevent inadvertent slip-off of the rod 11.

The above springy bridge 1 interconnects the right-and-left attachment glasses S and S with each other in juxtaposition. That is to say, an aperture h is provided through a portion around the upper rim middle part $S_c$ of the respective glasses S and S, a portion around the outer upper rim part $S_t$ thereof and a portion around the outer lower rim part $S_b$ thereof. The profiled rod 11 provided at the respective ends of the bridge 1 is inserted into the aperture h that is opened at the portion around the upper rim middle part $S_c$ of the respective glasses S and S.

Figure 1:
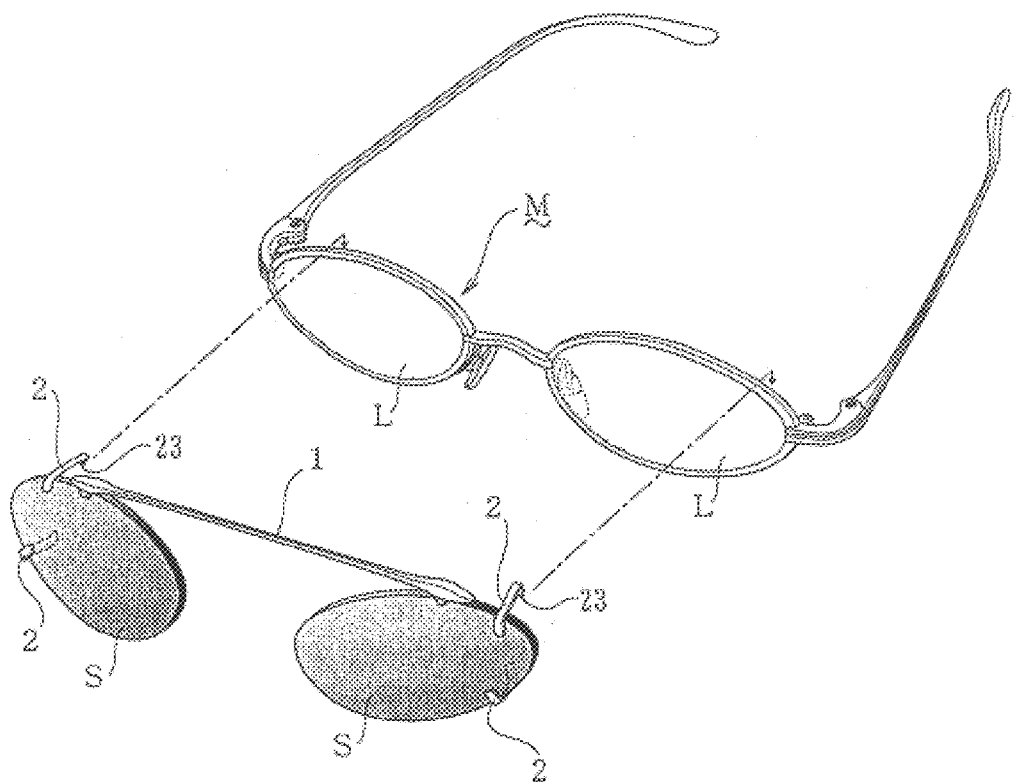
FIG. 1 is a perspective view to show the method for overlaying the clip-on spectacles according to the present invention onto the spectacles in use.
Figure 2:
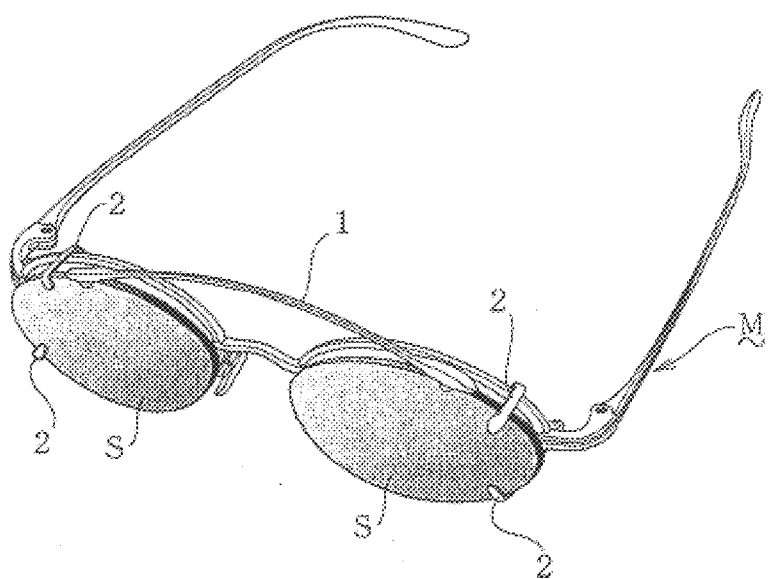
FIG. 2 is a perspective view to show the clip-on spectacles as shown in FIG. 1 overlaid onto the spectacles in use.
Figure 3:
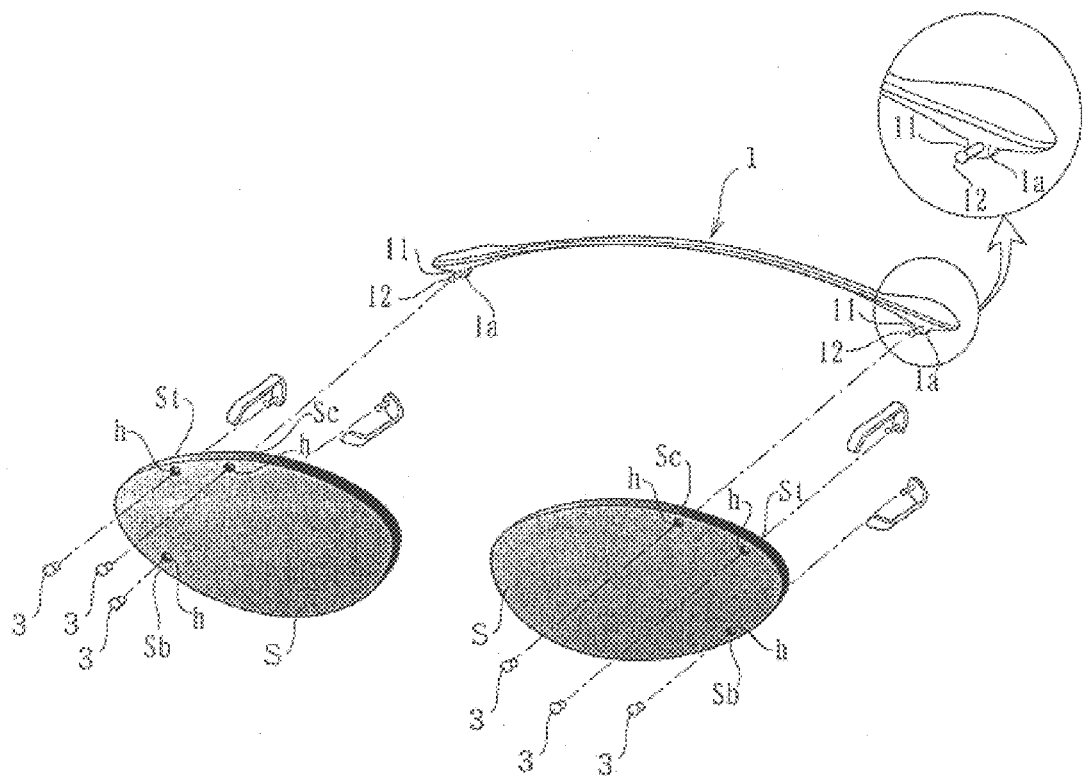
FIG. 3 is a broken perspective view to show the assembly parts of the clip-on spectacles according to the present invention.
Figure 4:
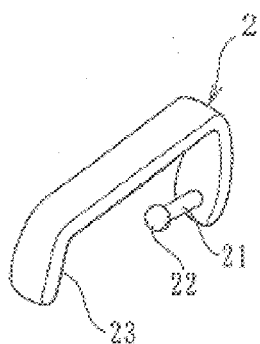
FIG. 4 is a perspective view of the inwardly inclined hook embodied in the present invention.
Figure 5:
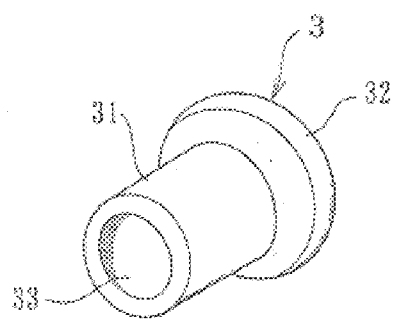
FIG. 5 is a perspective view of the cap embodied in the present invention.

Numeral 2 as referred to in the drawings in an inwardly inclined hook, which hook is made of German silver in this embodiment. This hook is attached onto the portion around the outer upper rim part $S_t$ and that around the outer lower rim part $S_b$ of the respective attachment glasses S and S and is crooked in shape as shown in FIG. 4 in this embodiment. This hook 2 is provided at its one end with a profiled rod 21 to be inserted into the aperture h of the attachment glass S, at the tip end of which rod an enlarged portion 22 is provided, while being provided at its other end with a bent portion 23 to be hung onto the inner side of the respective lenses L and L of the spectacles in use M.

Numeral 3 as referred to in the drawings indicates a cap, which cap is made from polyphenylene sulfide (PPS) resin and molded into mushroom shape. The cap 3 is provided with a head portion 32 at one end of a shank portion 31 thereof, in which shank portion 31 an aperture 33 into which the above profiled rods 11 and 12 are mounted is opened through and which aperture elastically deforms at the time when the enlarged portions 12 and 22 are inserted therein. Thereby, the profiled rods 11 and 21 and the aperture 33 are securely held in check.

The assembly of the clip-on attachment spectacles according to the present invention takes the following operational steps, for instance.

(1) The profiled rod 11 at the respective ends of the springy bridge 1 is inserted into the aperture h at the portion around the upper rim middle part $S_c$ of the respective glasses S and S and the cap 3 is mounted into the enlarged portion 12 of the profiled rod 11 at the inner side of the respective glasses S and S. The aperture 33 of the cap 3 elastically deforms so as to firmly attach onto the enlarged portion 12, and the respective glasses S and S are firmly interconnected to each other with interposed between the respective ends of the bridge 1 and the head portion 32 of the cap 3 so as to be held in juxtaposition through the bridge.

(2) Then, the profiled rod 21 of the hook 2 is inserted at the frontal side of the respective glasses S and S into the aperture h at the portion around the outer upper rim part $S_t$ and that around the outer lower rim part $S_b$ and the cap 3 is mounted at the inner side of the respective glasses S and S into the enlarged portion 22 of the rod 21. Thereby, the aperture 33 of the cap 3 elastically deforms so as to firmly receive the enlarged portion 12 therein, and the respective hooks 2 are firmly clamped onto the portion around the outer upper rim part $S_t$ of the respective glasses S and S and the portion around the outer lower rim part $S_b$ thereof.

When the clip-on attachment spectacles as assembled above is aligned in front of the respective lenses L and L of the spectacles in use M while the bridge 1 is extended widthwise against its contractile force so as to widen the interval between the respective glasses S and S and the bridge 1 is then elastically contracted, the respective hooks are stably hung onto the respective lenses L and L of the spectacles in use M.

The best mode for carrying out the present invention has been described above, but the present invention is to limited to the above embodiment, which can be modified into various manners within the scope of the accompanying patent claims.

Figure 6:
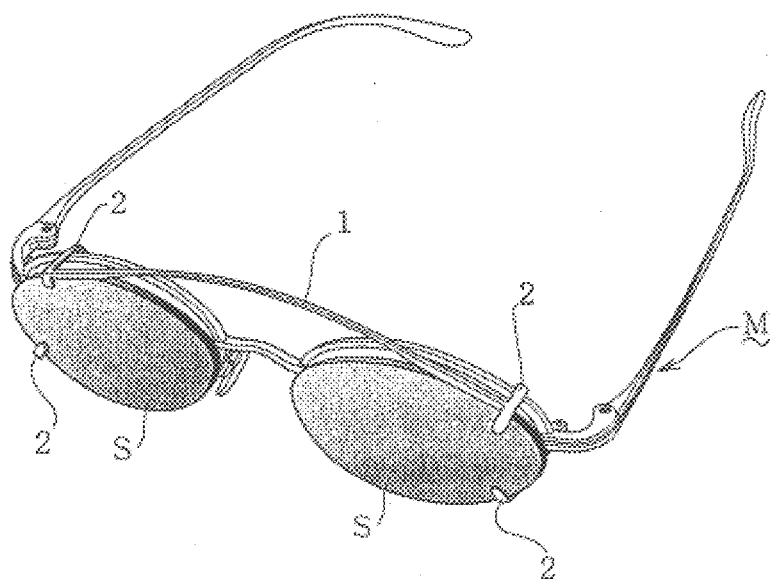
FIG. 6 is a perspective view to show a modified example of the clip-on spectacles overlaid onto the spectacles in use.
Figure 7:
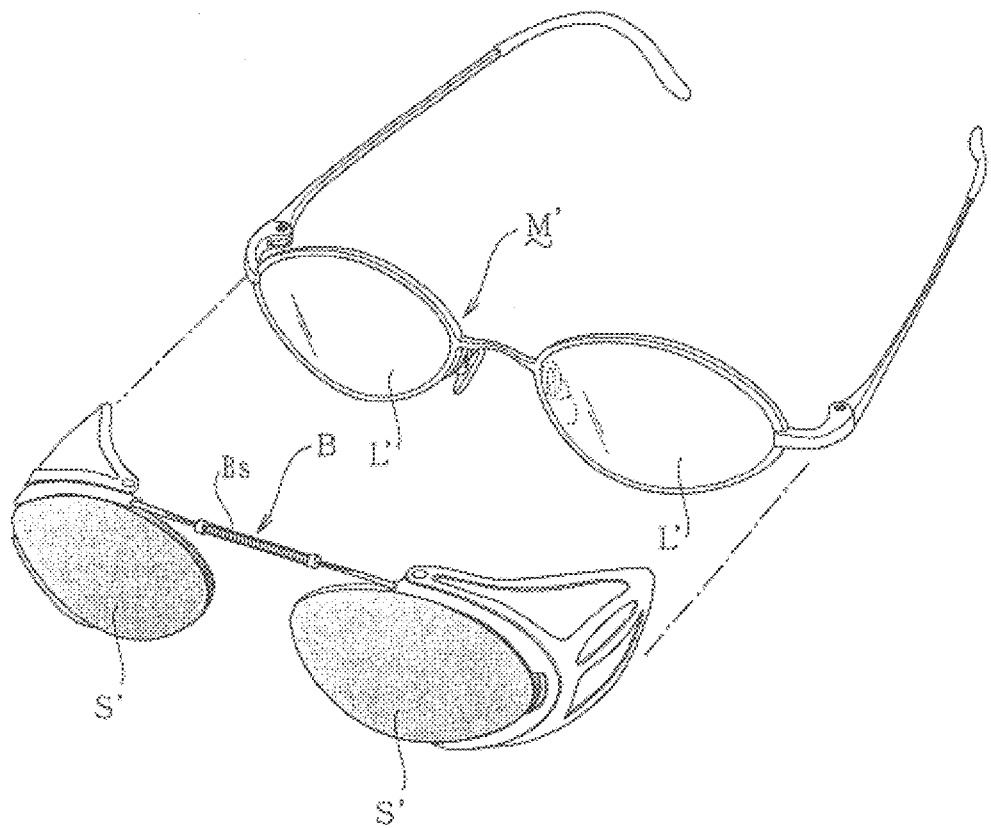
FIG. 7 is a perspective view of the prior clip-on attachment spectacles.

For instance, in the above embodiment, the springy bridge 1 is arranged such that it is connected to the respective glasses S and S separately from the inwardly inclined hook 2 that is disposed at a portion around the outer upper rim part $S_t$ of the respective glasses S and S, but it does not matter whether the hook 2 is integrally provided at the respective ends of the bridge 1 as shown in FIG. 6 and the bridge 1 is clamped onto the respective glasses S and S through the profiled rod 21 of the hook 2 to be inserted into a portion around the outer upper rim part $S_t$ thereof so as to hold the glasses S and S in juxtaposition. This modified example also belongs to the technical scope of the present invention.

As described above with the embodiment, the clip-on attachment spectacles according to the present invention is assembled such that the respective glasses thereof are interconnected to each other just by inserting a profiled rod provided at the respective ends of the springy bridge through the glasses and by mounting a cap into the rod at the inner side of the respective glasses as well as by inserting a profiled rod of the inwardly inclined hook through the outer upper and lower rim portions, respectively of the respective glasses and by mounting a cap into the rod at the inner side of the respective glasses, so that the productivity improves, and the production cost greatly reduces in comparison with the prior art, in view of the fact that the number of the assembly parts is streamlined. Further, the interconnection between the assembly parts of the clip-on attachment spectacles in accordance with the present invention is structurally stable, in spite of the fact that its structure is extremely simple, so that it excels in shape stability and keeps intact for a long period of time.

Further, the clip-on attachment spectacles as assembled according to the present invention is manufactured into a rimless type just with a pair of attachment glasses, a springy bridge, an inwardly inclined hook and a cap, so that it does not necessarily require a rim to enclose the attachment glasses with. Accordingly, provided that the attachment spectacles is provided in a rimless type, the unworked glasses are shipped out to the retailing shops, in which shops the glasses are cut out to the shape of the lenses of the spectacles in use, which enables the attachment spectacles that is most suitable to the spectacles in use to be provided to each clients.

In view of the foregoing, the present invention completely resolves the inconveniences encountered with the prior art so as to be replete with practical and economical advantages or merits over the prior art, so that the industrial applicability thereof is very high.

What is claimed is:

1. Assembly of clip-on attachment spectacles comprising a transversely long springy bridge 1, an interval between the respective ends of which bridge is elastically variable and a profiled rod 11 provided at the respective ends of which bridge is inserted through the respective attachment glasses S and S so as to hold said glasses in juxtaposition; an inwardly inclined hook 2 that hangs onto the respective lenses L and L of a pair of spectacles in use M and is provided with a profiled rod 21, which rod is arranged to insert through the respective attachment glasses S and S at a portion around an outer upper rim part $S_t$ thereof and a portion around an outer lower rim part $S_b$ thereof; a cap 3 that mounts into the profiled rods 11 and 21, respectively, at an inner side of the respective glasses S and S so as to interconnect said glasses with the bridge 1 and the hook 2, respectively.

2. Assembly of clip-on attachment spectacles according to claim 1 wherein the bridge 1 is formed into a bow shape so that it does not touch a brow of a wearer, by extending straight which bridge, an interval between the respective attachment glasses S and S enlarges and by springing back which bridge to recover its original bow shape, said interval narrows.

3. Assembly of clip-on attachment spectacles according to claim 1 wherein the springy bridge 1 is made of a super elastic metallic material.

4. Assembly of clip-on attachment spectacles according to claim 1 wherein the cap 3 is made of a plastic material.

5. Assembly of clip-on attachment spectacles according to claim 2 wherein the cap 3 is made of a plastic material.

6. Assembly of clip-on attachment spectacles according to claim 1 wherein the inwardly inclined hook 2 is made of a metallic material.

7. Assembly of clip-on attachment spectacles according to claim 2 wherein the inwardly inclined hook 2 is made of a metallic material.

8. Assembly of clip-on attachment spectacles according to claim 2 wherein the inwardly inclined hook 2 is made of a metallic or plastic material.

9. Assembly of clip-on attachment spectacles according to claim 2 wherein an engagement portion of the bridge 1 with the outer upper rim part $S_t$ of the respective glasses S and S is integrally provided with an inwardly inclined hook 2, through a profiled rod 21 of which hook 2 the respective glasses S and S are held in juxtaposition.

10. Assembly of clip-on attachment spectacles according to claim 1 wherein the springy bridge 1 is made of a super elastic engineering plastics.

11. Assembly of clip-on attachment spectacles according to claim 1 wherein the inwardly inclined hook 2 is made of a metallic or plastic material.

12. Assembly of clip-on attachment spectacles according to claim 1 wherein an engagement portion of the bridge 1 with the outer upper rim part $S_t$ of the respective glasses S and S is integrally provided with an inwardly inclined hook 2, through a profiled rod 21 of which hook 2 the respective glasses S and S are held in juxtaposition.

13. Assembly of clip-on attachment spectacles according to claim 2 wherein the springy bridge 1 is made of a super elastic metallic material.

14. Assembly of clip-on attachment spectacles according to claim 2 wherein the springy bridge 1 is made of a super elastic engineering plastics.

\* \* \* \* \*